(12) United States Patent
Feder

(10) Patent No.: US 11,259,497 B2
(45) Date of Patent: Mar. 1, 2022

(54) COUNTERTOP COOKING APPLIANCE

(71) Applicant: Glen Andrew Feder, Millburn, NJ (US)

(72) Inventor: Glen Andrew Feder, Millburn, NJ (US)

(\*) Notice: Subject to any disclaimer, the term of this patent is extended or adjusted under 35 U.S.C. 154(b) by 0 days.

(21) Appl. No.: 17/412,099

(22) Filed: Aug. 25, 2021

(65) Prior Publication Data

US 2021/0378206 A1    Dec. 9, 2021

Related U.S. Application Data

(63) Continuation-in-part of application No. 16/226,610, filed on Dec. 19, 2018.

(60) Provisional application No. 62/607,707, filed on Dec. 19, 2017.

(51) Int. Cl.
| | |
|---|---|
| *A01J 25/02* | (2006.01) |
| *A01J 25/11* | (2006.01) |
| *A01J 25/15* | (2006.01) |
| *A47J 27/00* | (2006.01) |
| *A47J 43/06* | (2006.01) |
| *A47J 43/07* | (2006.01) |
| *A47J 43/044* | (2006.01) |

(52) U.S. Cl.
CPC .............. *A01J 25/02* (2013.01); *A01J 25/115* (2013.01); *A01J 25/15* (2013.01); *A47J 27/004* (2013.01); *A47J 43/044* (2013.01); *A47J 43/06* (2013.01); *A47J 43/0711* (2013.01); *A47J 2043/04454* (2013.01); *A47J 2043/0733* (2013.01)

(58) Field of Classification Search
CPC ........... A01J 25/02; A01J 25/115; A01J 25/15
See application file for complete search history.

(56) References Cited

U.S. PATENT DOCUMENTS

| | | | |
|---|---|---|---|
| 4,693,610 A | 9/1987 | Weiss | |
| 4,802,407 A | 2/1989 | Negri | |
| 5,852,965 A * | 12/1998 | Kim | A47J 27/004 99/281 |

(Continued)

FOREIGN PATENT DOCUMENTS

| | | |
|---|---|---|
| WO | WO1991015143 | 10/1991 |
| WO | WO2017007211 A1 | 1/2017 |
| WO | WO2020128648 A1 | 6/2020 |

*Primary Examiner* — Jessica Cahill
*Assistant Examiner* — Jared O Brown

(57) ABSTRACT

A countertop cooking appliance is an apparatus that is used to manufacture food, particularly cheeses, with controlled heating, mixing, drainage, and pressure cycles. The apparatus is also configured to accept various cooking patterns for different foods based on different recipes. A perforated drainer is used to hold ingredients for mixing, completed cheese curds, and the finalized cheese product. A processing receptacle is a container that holds the perforated drainer and temporarily stores whey and process byproducts. A byproduct receptacle is a storage unit for whey and other liquid byproducts produced in the cheese development process. A fluid pump applies pressure to fluids collected in the processing receptacle, transferring them to the byproduct receptacle. A linear actuator provides mechanical power to one of several detachable food-interacting heads, which consequently chops, mixes, or otherwise agitates the contents of the perforated container.

18 Claims, 8 Drawing Sheets

(56) References Cited

U.S. PATENT DOCUMENTS

| | | | |
|---|---|---|---|
| 6,180,153 B1 | 1/2001 | Palus | |
| 6,213,007 B1 | 4/2001 | Lande | |
| 6,280,781 B1* | 8/2001 | Lande | A23G 9/12 |
| | | | 426/34 |
| 8,534,189 B2 | 9/2013 | Pavero | |
| 2009/0223385 A1* | 9/2009 | Heald | A23C 19/02 |
| | | | 99/453 |
| 2010/0263551 A1* | 10/2010 | Pavero | A01J 25/008 |
| | | | 99/348 |
| 2017/0303498 A1* | 10/2017 | Kong | A01J 99/00 |
| 2019/0183087 A1 | 6/2019 | Feder | |

\* cited by examiner

COUNTERTOP COOKING APPLIANCE

The current application is a continuation-in-part (CIP) application of a U.S. non-provisional application Ser. No. 16/226,610 filed on Dec. 19, 2018. The U.S. non-provisional application Ser. No. 16/226,610 claims a priority to a U.S. provisional application Ser. No. 62/607,707 filed on Dec. 19, 2017.

FIELD OF THE INVENTION

The present invention generally relates to food devices. More particularly, the present invention is a cheese-making countertop cooking appliance which includes a touch-screen display that allows the user to choose from various default recipes of cheese. Additionally, the present invention can be synced to a software application to share and receive custom recipes with other users.

BACKGROUND OF THE INVENTION

The human species would never have survived through winter without harnessing the preservative power of natural fermentation and enjoying the consequent nutritional improvements. Through processes that typically involve the addition and use of salts, acids, and temperature-controlled environments, vegetables, meats, and dairy products could develop into krauts, cured meats, and cheeses, each of which contains a wide array of probiotic benefits. Trends in mass food manufacturing, however, have borne the elimination of such methods due primarily to their reliance on complicated bacterial processes. While fermentation done properly is harmless and nutritionally beneficial, improper fermentation can lead to the development of various molds and bacteria that are dangerous for humans to consume. Therefore, mass-produced foods are now often developed with artificial preservatives, thus depriving the resultant foods of not only their beneficial probiotic benefits but also much of their flavor.

In response to the challenges presented by mass food production, social trends indicate a reversion to the old methods of fermentation, with a few modern improvements. Sauerkrauts, kimchis, pickles, beers, and many other foods and drinks can be created by an individual with little expertise and a small amount of equipment. Unfortunately, a simple process for making cheese at home consistently and safely remains elusive. Purchasing pre-made cheese means the user has no control in taste, freshness, or quality; however, with lack of a better option, this is often standard practice. Among the many challenges present in the cheese-making process, the maker has to worry about managing heat, adding appropriate amounts of ingredients, timing, draining whey, and, in many cases, applying constant pressure. Cheese-making devices are large and expensive, typically being designed for commercial as opposed to individual use. What is needed is a countertop device that can accept ingredients and instructions and can automatically deliver homemade cheeses. Further desirable is a device that provides a variety of cheese-making instructions for different cheeses.

The present invention addresses these issues. The present invention utilizes a touch-screen interface to allow the user to input instructions or select from a variety of existing recipes online. Additionally, the present invention can be synchronized with a software application to share and receive custom recipes with other users. The present invention includes a heating element for heating the ingredients of the cheese at appropriate times, temperatures, and durations during the cheese-making process. A specialized grid cutter is used to both mix ingredients during the liquid stages and to cut the curd in the later stages of the cheese-making process. A pressing assembly can be added to allow the user to provide constant, even pressure to their cheese for the formation of hard cheeses. The present invention pumps excess whey byproduct into a tank for disposal or subsequent processing by the user. Due to the controlled environment created by the present invention, the present invention can further be utilized for the creation of tofu, and even as a sous vide.

DETAILED DESCRIPTION OF THE INVENTION

All illustrations of the drawings are for the purpose of describing selected versions of the present invention and are not intended to limit the scope of the present invention.

Figure 1:
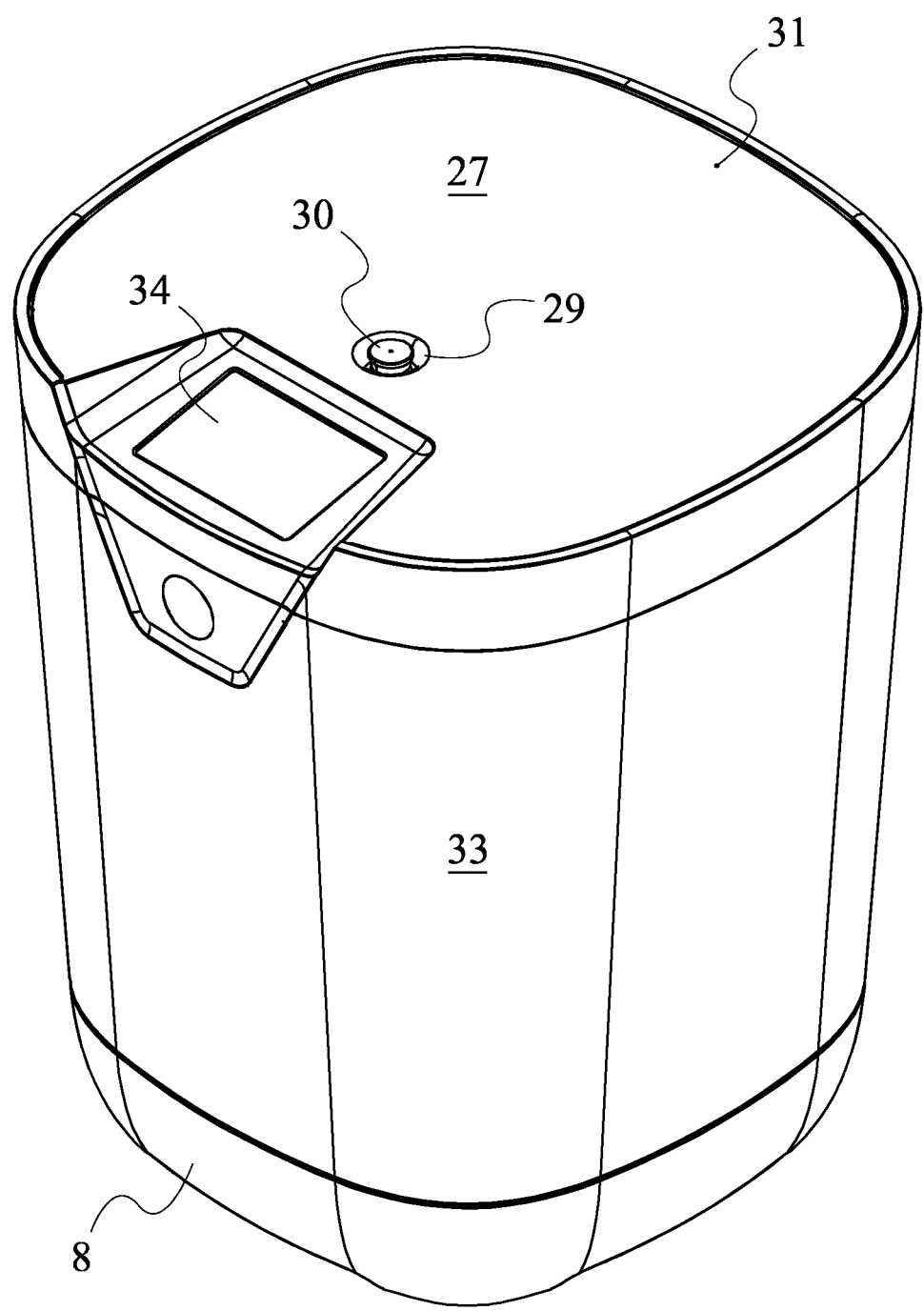
FIG. 1 is a front-top perspective view of the present invention.
Figure 2:
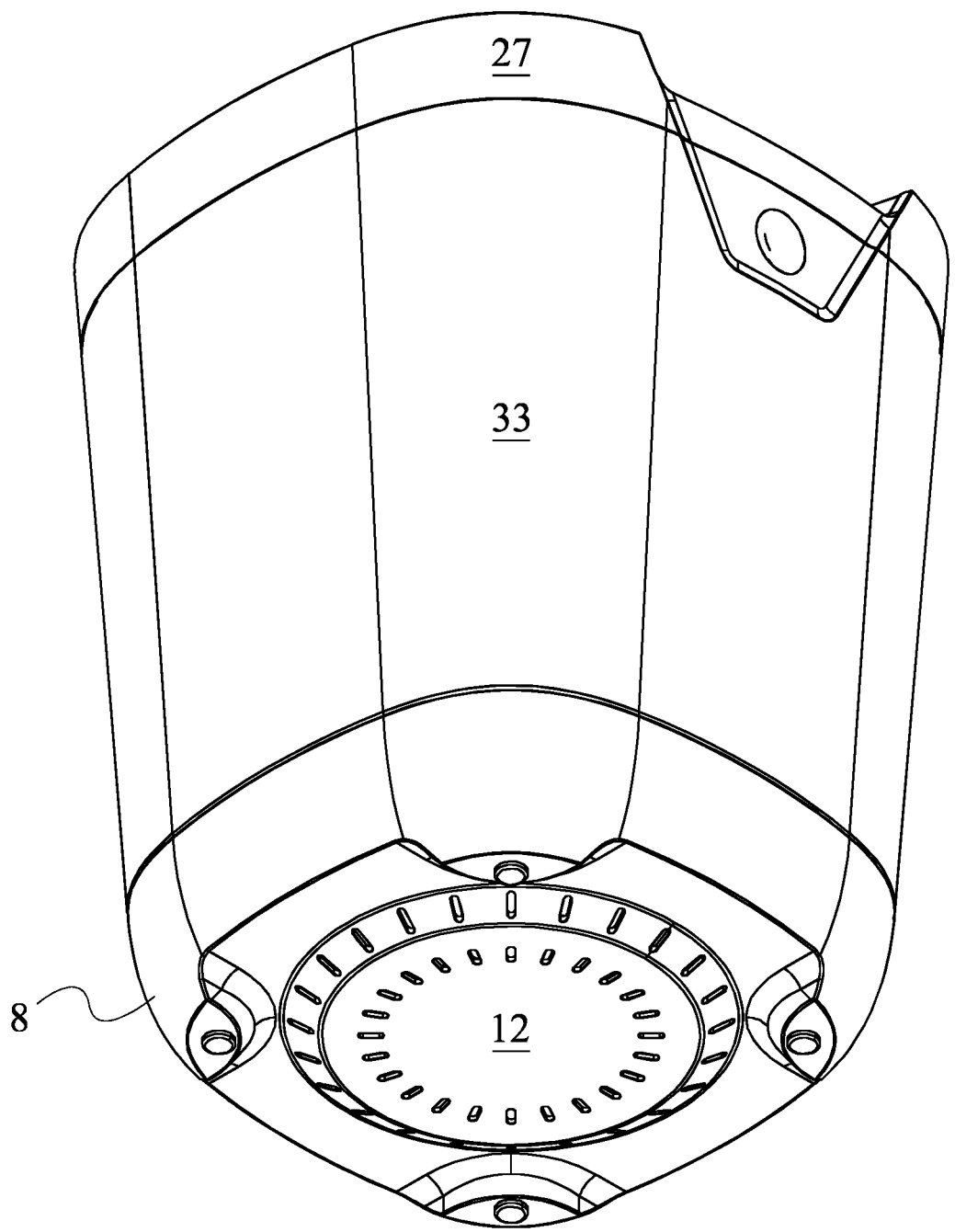
FIG. 2 is a front-bottom perspective view of the present invention.
Figure 3:
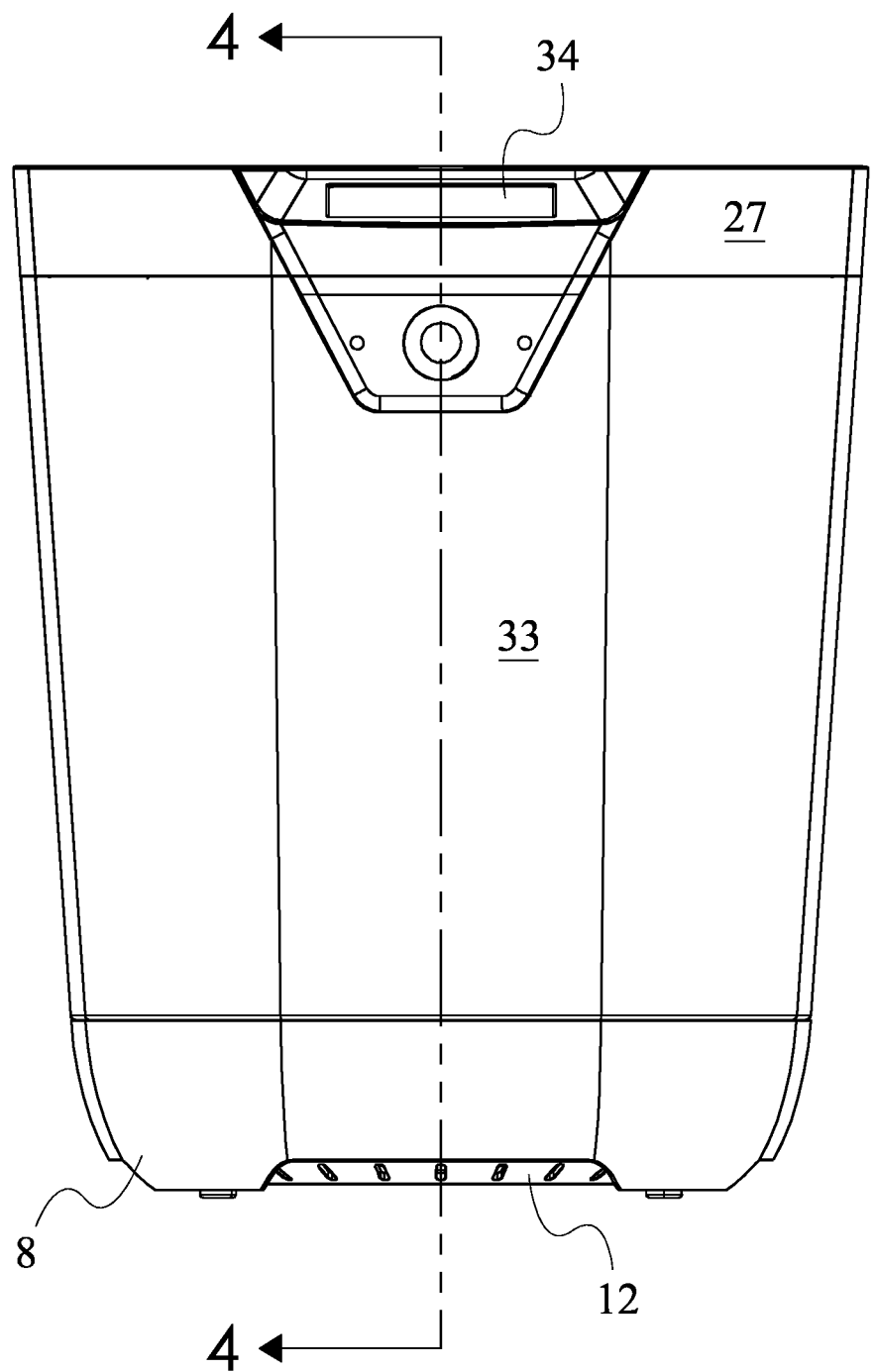
FIG. 3 is a front view of the present invention.

The present invention is a countertop cooking appliance that is used to manufacture food, particularly cheeses, with controlled heating, mixing, drainage, and pressure cycles. The present invention is also configured to accept various cooking patterns for different foods based on different recipes. The present invention may comprise a perforated drainer 1, a processing receptacle 3, a byproduct receptacle 4, a vacuum pump 5, a structural base 8, a motor 9, a heater 12, a controller 13, at least one interchangeable food-interacting head 14, and a lid 27, as shown in FIG. 1. The perforated drainer 1 is a container used to hold ingredients for mixing, cheese curds, and the finalized cheese product, while enabling separation of solids from various liquid byproducts. The processing receptacle 3 is a container that holds the perforated drainer 1 and temporarily stores whey and process byproducts during cheese processing. The byproduct receptacle 4 is a long-term storage unit for whey and other liquid byproducts produced in the cheese development process. The vacuum pump 5 is a mechanical unit that applies pressure to fluids collected in the processing receptacle 3. The structural base 8 is a rigid unit with high-friction gripping feet that allows for arrangement of the processing receptacle 3 and the byproduct receptacle 4. The motor 9 is a unit capable of converting electrical energy into rotational mechanical energy. The heater 12, as shown in FIG. 2, is a temperature control mechanism that allows for thermal regulation of the contents of the perforated drainer 1. The controller 13 is an electrical unit capable of converting electrical inputs from sensors and instructions and converting them into electrical signals for the vacuum pump 5, the motor 9, the heater 12, and any other devices requiring logic application or signal management. The at least one interchangeable food-interacting head 14 is a set of components that allows for pressing, cutting, mixing, or other interactions with the contents of the perforated drainer 1. The lid 27, as shown in FIG. 3, is a rigid structural unit which allows for housing and arrangement of components and further allows the user to selectively access the contents of the perforated drainer 1, processing receptacle 3, and byproduct receptacle 4.

Figure 4:
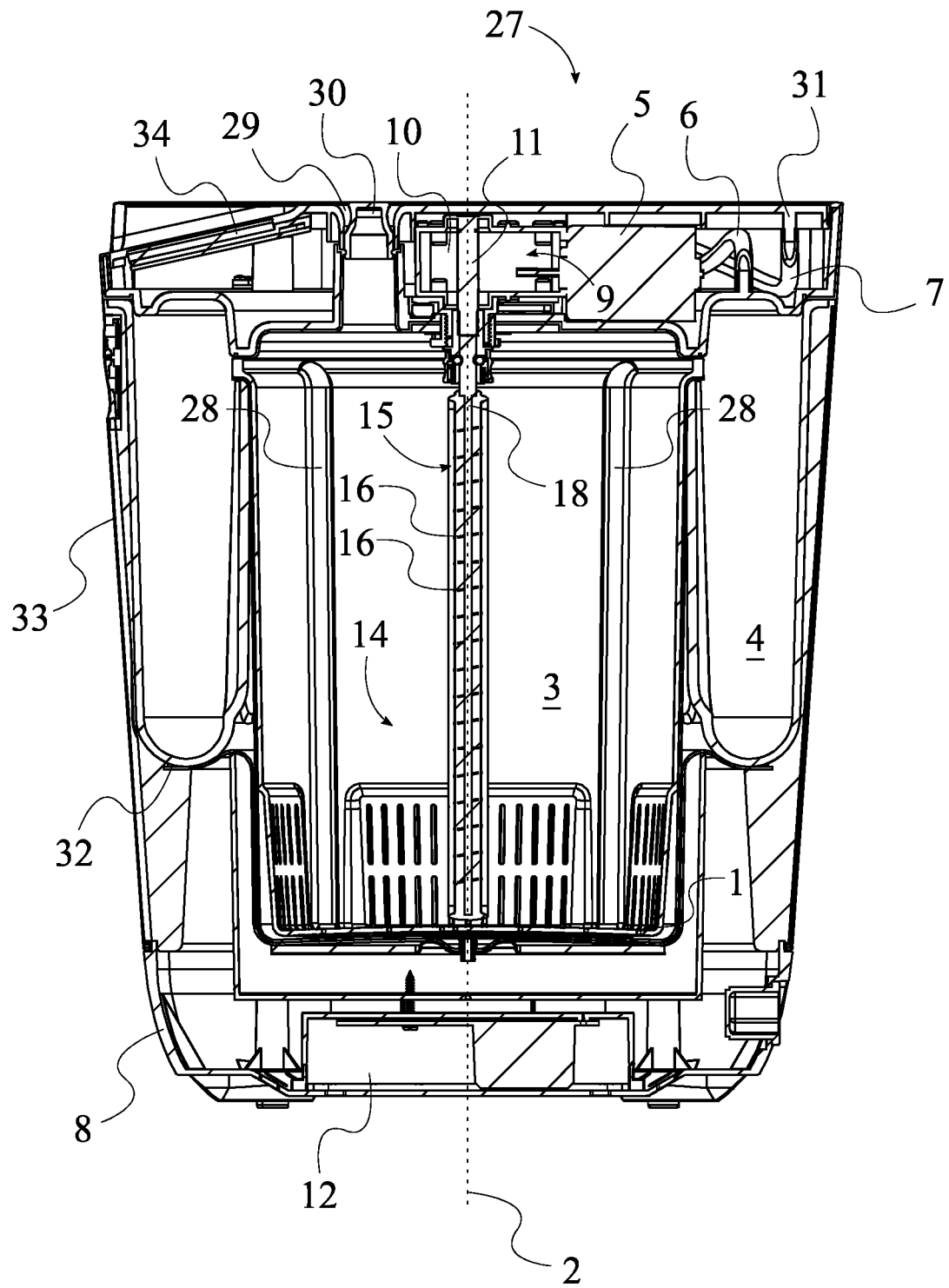
FIG. 4 is a sectional view taken along line 4-4 in FIG. 3 of the present invention.

The general configuration of the aforementioned components allows the present invention to efficiently and effectively create cheese and other foods from basic ingredients and instructions. The processing receptacle 3 may be mounted onto the structural base 8, as shown in FIG. 4. In this way, the structural base 8 allows for appropriate positioning of the processing receptacle 3. The byproduct receptacle 4 may be mounted around the processing receptacle 3. This arrangement ensures desirable proximity of the byproduct receptacle 4 to the processing receptacle 3 during processing, thus enhancing the ability of the present invention to separate byproducts from cheese or other food. The vacuum pump 5 may be in fluid communication with the processing receptacle 3 through the byproduct receptacle 4. Thus, the vacuum pump 5 is capable of creating a low-pressure zone within the byproduct receptacle 4, which allows fluid to move from the processing receptacle 3 to the byproduct receptacle 4. The perforated drainer 1 may be situated within the processing receptacle 3. In this way, the processing receptacle 3 may support and arrange the perforated drainer 1 appropriately during use. The heater 12 may be integrated into the structural base 8. This arrangement positions the heater 12 appropriately for interaction with the processing receptacle 3. The heater 12 may be in thermal communication with the processing receptacle 3. Thus, the heater 12 can affect and control the temperature of the processing receptacle 3, and by extension, the contents of the perforated drainer 1. The lid 27 may be hermetically attached to the processing receptacle 3, opposite the structural base 8. This arrangement ensures that the processing receptacle 3 may experience pressure fluctuations due to activation of the vacuum pump 5. The vacuum pump 5 and the motor 9 may be mounted into the lid 27. In this way, the vacuum pump 5 may expel air from the processing receptacle 3, while the motor 9 may affect the processing receptacle 3 from above. The controller 13 may be mounted within the lid 27. This provides the controller 13 with desirable access to the various electronics stored within the present invention. The at least one interchangeable food-interacting head 14 may be operatively coupled to the motor 9, wherein the motor 9 is used to rotationally drive the at least one interchangeable food-interacting head 14 within the perforated drainer 1. The motor 9 provides rotational force that may be modified through gearboxes and applied, as with a cutter 15 or mixer, or converted into translational vertical force, as with a press 19. The controller 13 may be electronically connected to the heater 12, the vacuum pump 5, and the motor 9. In this way, the controller 13 may provide direction and distribute power appropriately through the present invention to the heater 12, the vacuum pump 5, and the motor 9.

Drainage during processing of cheese and other foods is necessary in order to achieve desired flavors and consistencies. To this end, the present invention may further comprise a plurality of drainage tubes 28, as shown in FIG. 4. The plurality of drainage tubes 28 is a set of tubular channels through which fluid may exit the processing receptacle 3 upon application of pressure. Each of the plurality of drainage tubes 28 may traverse out of the processing receptacle 3 and into the byproduct receptacle 4. This arrangement ensures that excess byproduct is guided from the processing receptacle 3 directly to the byproduct receptacle 4. The plurality of drainage tubes 28 may be positioned around the processing receptacle 3. In this way, whey and other fluid processing byproducts may exit the processing receptacle 3 evenly.

Figure 5:
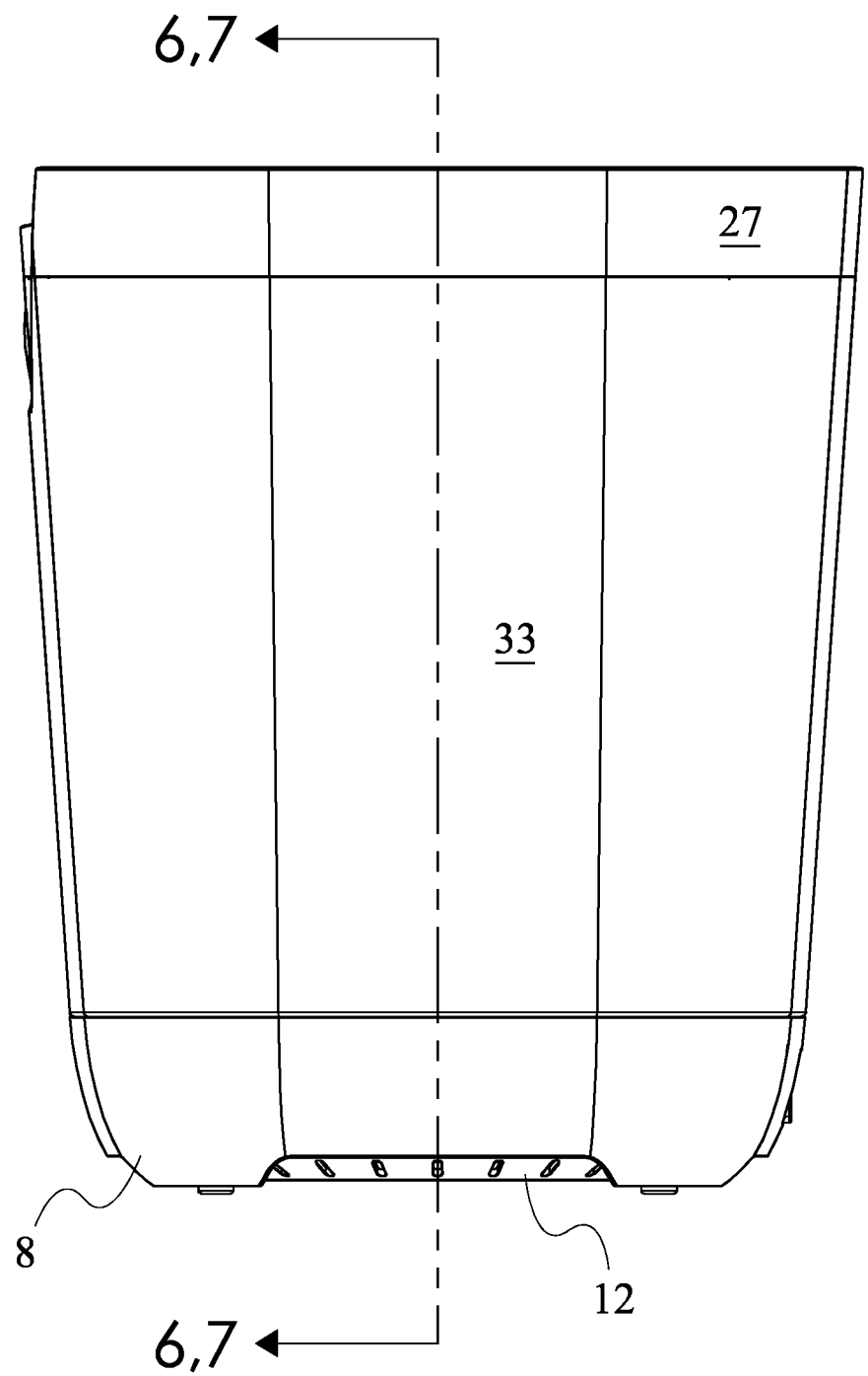
FIG. 5 is a right view of the present invention.

While the lid 27 must form a hermetic seal over the processing receptacle 3, the lid 27 may also benefit from a removable connection around the outer edges of the present invention. To this end, the lid 27 may be magnetically attached to the byproduct receptacle 4, as shown in FIG. 5. This arrangement allows a user to magnetically engage the lid 27 to the byproduct receptacle 4 during processing and magnetically disengage the lid 27 from the byproduct receptacle 4 to remove produced foods and for maintenance purposes.

The user may wish to add ingredients to the processing receptacle 3 while the hermetic seal from the lid 27 is in place. To enable this, the present invention may further comprise an ingredient inlet 29, as shown in FIG. 1. The ingredient inlet 29 is a hole in the lid 27 that allows for insertion of ingredients into the processing receptacle 3 while the lid 27 is on. The ingredient inlet 29 traverses through the lid 27 and into the processing receptacle 3. In this way, the ingredient inlet 29 facilitates addition of ingredients during processing.

Oftentimes, it is beneficial to add ingredients before pressurized draining of byproducts from the processing receptacle 3. To this end, the present invention may further comprise an inlet stopper 30, as shown in FIG. 4. The inlet stopper 30 is a generally rigid unit which fits within the ingredient inlet 29 to prevent ingredients from escaping through the ingredient inlet 29. The inlet stopper 30 may be hermetically attached into the ingredient inlet 29. Thus, the inlet stopper 30 prevents contaminants from undesirably entering or exiting the processing receptacle 3 while allowing selective access to the processing receptacle 3 during use.

The vacuum pump 5 requires an endpoint at which to deposit air that has been vacuumed from the processing receptacle 3. To this end, the present invention may further comprise a pump exhaust 31, as shown in FIG. 4. The pump exhaust 31 is a hole through which air from the vacuum pump 5 may enter the present invention. The vacuum pump 5 may comprise a pump inlet 6 and a pump outlet 7. The pump inlet 6 denotes the end of the vacuum pump 5 through which air may enter the vacuum pump 5. Conversely, the pump outlet 7 denotes the end of the vacuum pump 5 through which air may exit the vacuum pump 5, generating the desired vacuum pressure. The pump exhaust 31 may be integrated into the lid 27, adjacent to the pump outlet 7. This arrangement allows the vacuum pump 5 to pull air through the lid 27 to exit the present invention. The pump inlet 6 may be positioned into the byproduct receptacle 4. Thus, the pressurized byproduct receptacle 4 may draw whey or other byproducts in from the processing receptacle 3.

Figure 6:
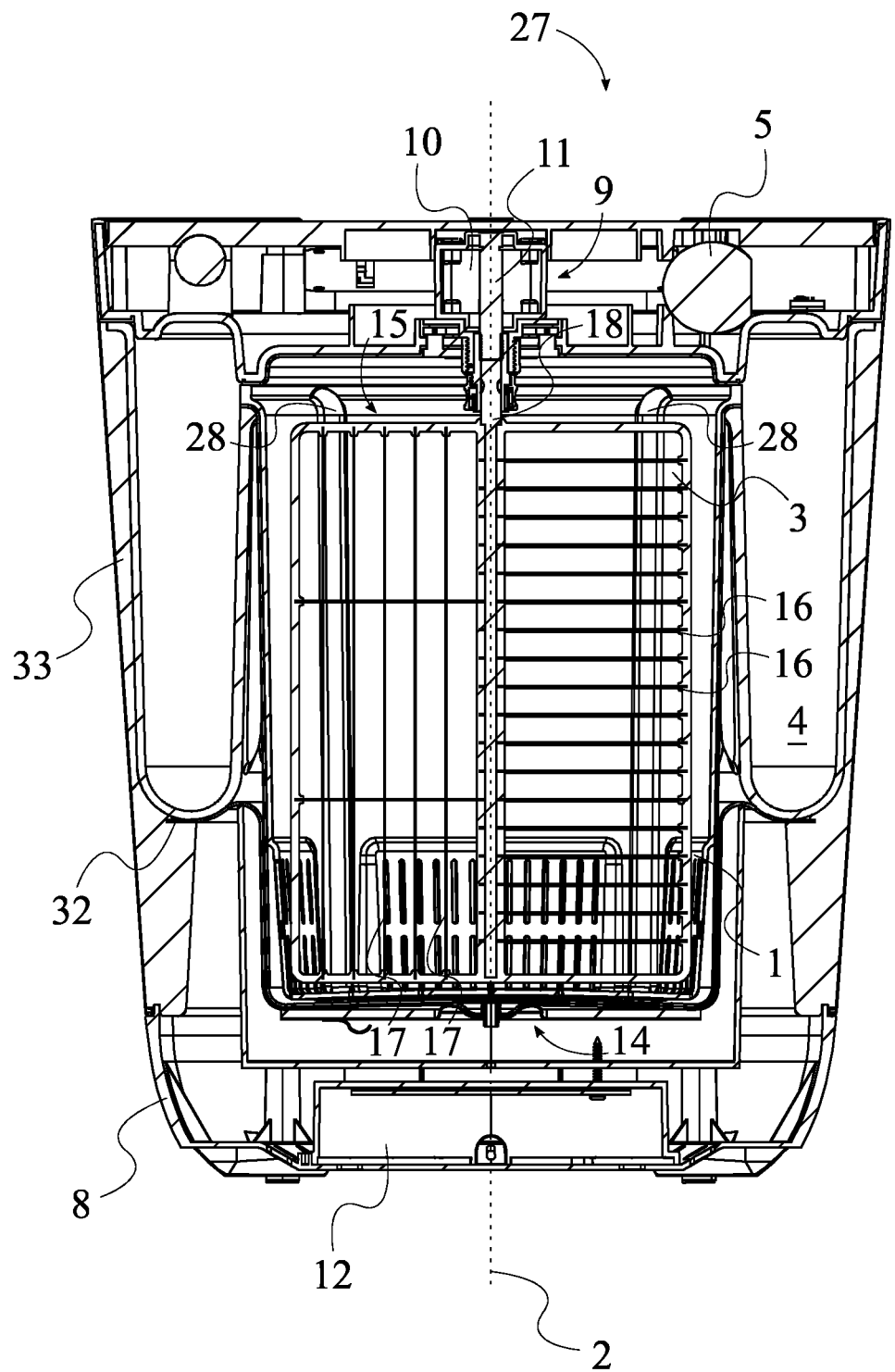
FIG. 6 is a cross-sectional view taken along line 6-6 in FIG. 5 of the present invention showing the cutter.

The byproduct receptacle 4 may require support in order to contain larger quantities of byproduct fluid. To enable this, the present invention may further comprise a receptacle setting 32, as shown in FIG. 6. The receptacle setting 32 is a component which may retain the byproduct receptacle 4 in position during use of the present invention. The receptacle setting 32 may be connected around the processing receptacle 3. In this way, the receptacle setting 32 may position the byproduct receptacle 4 appropriately adjacent to the processing receptacle 3. The byproduct receptacle 4 may be mounted onto the receptacle setting 32. Thus, the byproduct receptacle 4 may be positioned advantageously for receipt of byproduct during the preferred usage of the present invention.

The motor 9 must enable the at least one interchangeable food-interacting head 14 to rotate or translate independently from the perforated drainer 1. To this end, the motor 9 may comprise a stator 10 and a rotor 11, as shown in FIG. 6. The stator 10 refers to the segment of the motor 9 which is fixed relative to the lid 27. The rotor 11 denotes the portion of the motor 9 that rotates relative to the stator 10. The stator 10 may be connected into the lid 27. This arrangement prevents the motor 9 from moving during use of the motor 9. The rotor 11 may traverse out of the lid 27 and into the processing receptacle 3. In this way, the rotor 11 is positioned for connection to the at least one interchangeable food-interacting head 14.

The present invention requires a mechanism by which to cut through curds in order to assist in removing excess whey from cheese. To this end, the at least one interchangeable food-interacting head 14 may comprise a cutter 15 and a shaft 18, as shown in FIG. 6. The cutter 15 is an arrangement of blades that rotates in order to chop through the contents of the perforated drainer 1. The shaft 18 is an elongated extrusion that enables transfer of mechanical energy to the press 19. The cutter 15 comprises a plurality of first blades 16 and a plurality of second blades 17. The plurality of first blades 16 is a set of sharp extrusions that may cut through the contents of the perforated drainer 1 along a given orientation. Similarly, the plurality of second blades 17 is a set of sharp extrusions that may cut through the contents of the perforated drainer 1 along a different given orientation than that of the plurality of first blades 16. A rotor 11 of the motor 9 may be torsionally connected to the shaft 18. In this way, rotation of the rotor 11 results in corresponding rotation of the shaft 18. The cutter 15 may be laterally connected to the shaft 18. Thus, the cutter 15 rotates around the shaft 18 as the rotor 11 spins. The plurality of first blades 16 may be positioned perpendicular to the plurality of second blades 17. This arrangement allows the cutter 15 to cut through curds in chunks. The plurality of first blades 16 and the plurality of second blades 17 may be arranged in a grid configuration. In this way, the curd may be cut into optimally small volumes during the cutting process.

The curd must be agitated in multiple directions during cutting in order to ensure optimal removal of whey. To enable this, each of the plurality of first blades 16 may be positioned at a first acute angle with a central axis 2 of the perforated drainer 1, as shown in FIG. 4. This arrangement results in the generation of force that shifts the position of the curd, rather than continuously chopping through the same curd portions. Similarly, each of the plurality of second blades 17 may be positioned at a second acute angle with the central axis 2 of the perforated drainer 1. This arrangement results in the generation of force that shifts the position of the curd perpendicular to the force applied by the plurality of first blades 16, rather than continuously chopping through the same curd portions.

Figure 7:
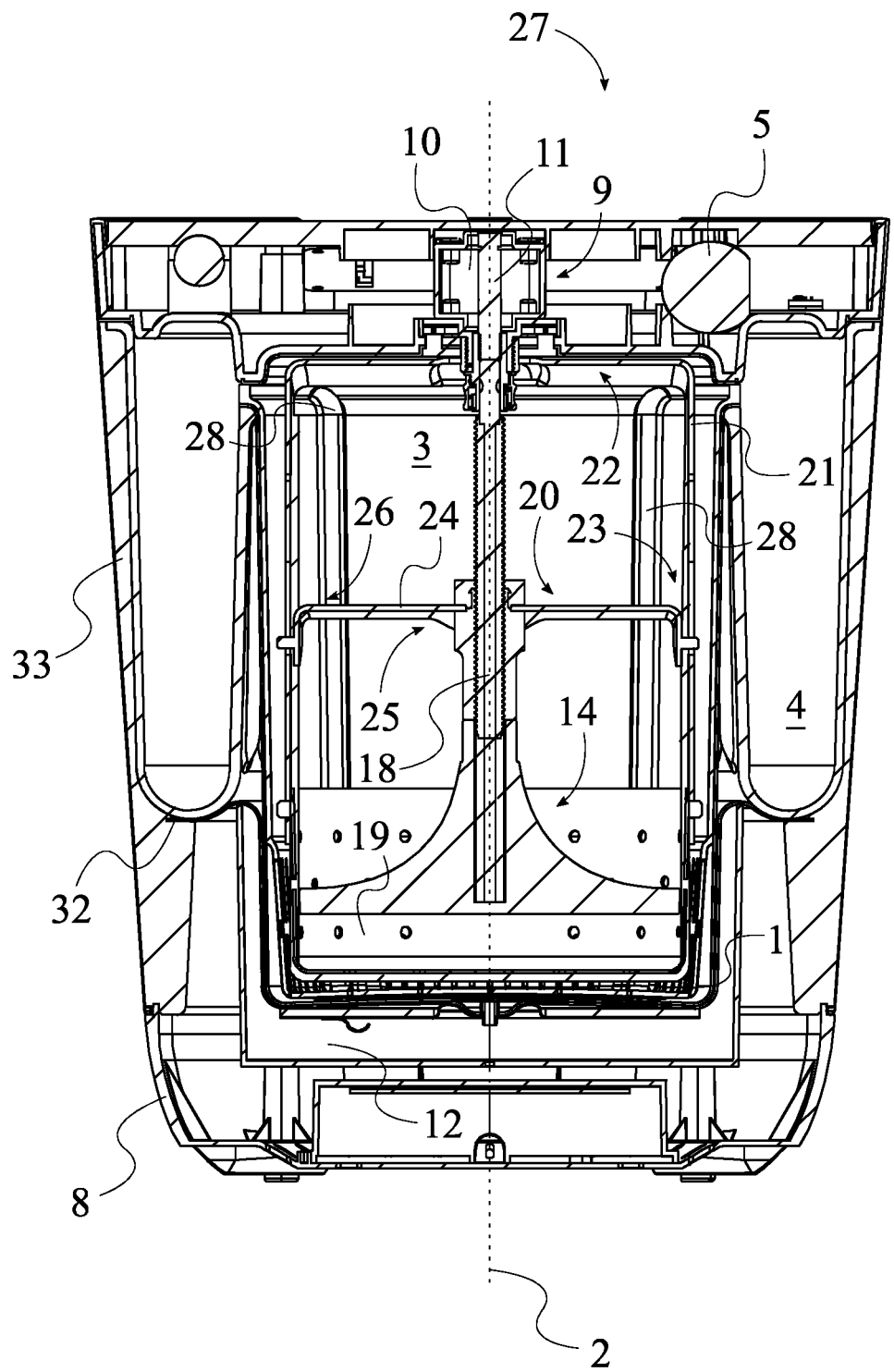
FIG. 7 is a cross-sectional view taken along line 7-7 in FIG. 5 of the present invention showing the press.

The present invention may further benefit from the ability to compress the contents of the perforated drainer 1. To enable this, the at least one interchangeable food-interacting head 14 may further comprise a press 19, a track 20, and a shaft 18, as shown in FIG. 7. The press 19 is a generally disc-shaped unit capable of transmitting large compressive forces. The track 20 is a mechanism that prevents the press 19 from rotating due to rotational forces in the shaft 18. A rotor 11 of the motor 9 may be torsionally connected to the shaft 18. This arrangement allows rotation of the rotor 11 to result in corresponding rotation of the shaft 18. The shaft 18 may be threadably engaged into the press 19, offset from the rotor 11 of the motor 9. In this way, the power of the rotor 11 may be transmitted to the press 19. The press 19 may be positioned normal to a central axis 2 of the perforated drainer 1. Thus, the press 19 may apply pressure evenly from the shaft 18. The track 20 may be positioned within the processing receptacle 3. In this way, the track 20 is arranged to provide necessary support for the press 19. The track 20 may be rotatably connected to the shaft 18. This arrangement allows the track 20 to support the press 19 independently from the shaft 18. The press 19 is slidably engaged along the track 20. Thus, the press 19 may only move vertically along the shaft 18 and not rotationally with the rotor 11.

The track 20 must be capable of guiding the press 19 in the proper vertical direction. To this end, the track 20 may comprise an L-shaped bracket 21 and a guidance bridge 24, as shown in FIG. 7. The L-shaped bracket 21 is a rigid support that is generally bent at a 90-degree angle. The guidance bridge 24 is a rigid support that joins the L-shaped bracket 21 and the shaft 18. The L-shaped bracket 21 may comprise a first bracket leg 22 and a second bracket leg 23. The first bracket leg 22 is a segment of the L-shaped bracket 21 that provides support for the guidance bridge 24. The second bracket leg 23 is another segment of the L-shaped bracket 21 opposite the first bracket leg 22 that provides support for the guidance bridge 24. The guidance bridge 24 may comprise a proximal bridge end 25 and a distal bridge end 26. The proximal bridge end 25 generally denotes the portion of the guidance bridge 24 that connects to the press 19. The distal bridge end 26 generally denotes the portion of the guidance bridge 24 that connects to the L-shaped bracket 21. The first bracket leg 22 may be rotatably connected to the shaft 18. This allows the shaft 18 to rotate independently from the first bracket leg 22. The second bracket leg 23 may be connected perpendicular to the first bracket leg 22, offset from the shaft 18. In this way, the second bracket leg 23 runs roughly parallel to the shaft 18. The distal bridge end 26 may be slidably connected along the second bracket leg 23. The distal bridge end 26 may therefore direct the press 19 through the guidance bridge 24. The proximal bridge end 25 may be laterally connected to the press 19. Thus, the press 19 may rise and fall as directed by the guidance bridge 24.

The present invention requires a protective unit to prevent damage to the electronic and mechanical components of the present invention. To this end, the present invention may further comprise a cover 33, as shown in FIG. 1. The cover 33 is a rigid extrusion that provides protection for the present invention. The structural base 8, the processing receptacle 3, the byproduct receptacle 4, and the at least one interchangeable food-interacting head 14 may be housed by the cover 33. This arrangement ensures that the structural base 8, the processing receptacle 3, the byproduct receptacle 4, and the at least one interchangeable food-interacting head 14 are protected during the food-making process.

A user may wish to interact with the present invention in person. To enable this, the present invention may further comprise a user-interfacing panel 34, as shown in FIG. 3. The user-interfacing panel 34 relates to a touchscreen surface that provides selectable options, including pre-set recipes as well as custom controls for applying heat, pressure, time, and agitation to the contained mixture. The user-interfacing panel 34 may be mounted into the lid 27, opposite the processing receptacle 3. This arrangement provides easy and intuitive access to the user-interfacing panel 34. The user-interfacing panel 34 may be electronically connected to the controller 13. Thus, the controller 13 may relay inputs received by the user-interfacing panel 34 to the appropriate connected electronic components, thus resulting in generation of desired food products. Moreover, the present invention may further comprise a wireless communication module 35 and an external computing device 36. The wireless communication module 35 is a device that provides internet connectivity for the present invention. The external computing device 36 can be, but is not limited to, a smartphone, a desktop computer, a laptop computer, or a tablet personal computer with a corresponding application that enables users to interact with the present invention, as well as with each other. The wireless communication module 35 may be mounted within the lid 27. This arrangement provides desirable proximity of the wireless communication module 35 to the controller 13. Furthermore, the wireless communication module 35 may be electronically connected to the controller 13. In this way, the controller 13 is equipped to send and receive signals directing the present invention. The wireless communication module 35 may be communicably coupled to the external computing device 36. This arrangement results in progress updates being provided to the user, and the user providing instruction to the present invention remotely.

Figure 8:
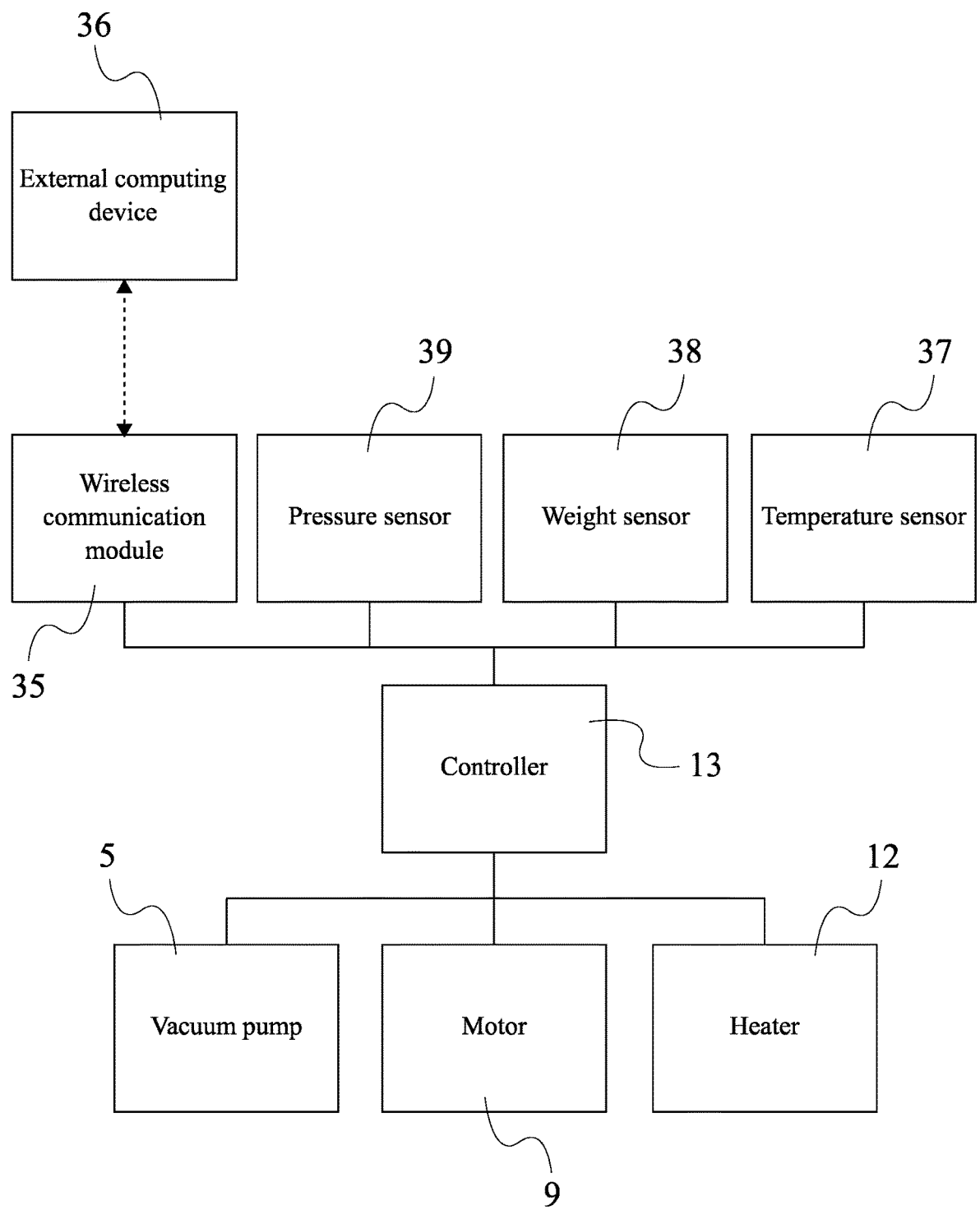
FIG. 8 is a schematic diagram representing the electrical and electronic connections of the present invention.

A wide array of sensors may be utilized in order to provide the controller 13 with feedback regarding the status of food preparation. To this end, the present invention comprises a temperature sensor 37, as represented in FIG. 8. The temperature sensor 37 is an electronic device capable of capturing data regarding thermal energy and converting that data into corresponding electrical signals. The temperature sensor 37 is in thermal communication with the processing receptacle 3. This arrangement allows the temperature sensor 37 to read the temperature of the processing receptacle 3, and consequently, of the perforated drainer 1. The temperature sensor 37 is electronically connected to the controller 13. This arrangement enables the temperature sensor 37 to relay collected data to the controller 13. The present invention further comprises a weight sensor 38. The weight sensor 38 is an electronic device capable of capturing data regarding mechanical pressure and converting that data into corresponding electrical signals. The weight sensor 38 is pressed in between the processing receptacle 3 and the structural base 8. This positioning allows the weight sensor 38 to capture data regarding the weight of items within the processing receptacle 3. The weight sensor 38 is electronically connected to the controller 13. This arrangement enables the weight sensor 38 to relay collected data to the controller 13. The present invention further comprises a pressure sensor 39. The pressure sensor 39 is a device capable of measuring ambient pressure within an enclosed space, including the vacuum pressure generated within the byproduct receptacle 4. The pressure sensor 39 is integrated into the byproduct receptacle 4. This arrangement enables the pressure sensor 39 to detect the vacuum pressure exerted upon fluids contained within the processing receptacle 3. The pressure sensor 39 is electronically connected to the controller 13. In this way, the pressure sensor 39 may relay collected data to the controller 13.

Although the invention has been explained in relation to its preferred embodiment, it is to be understood that many other possible modifications and variations can be made without departing from the spirit and scope of the invention as hereinafter claimed.

What is claimed is:

1. A food-making countertop appliance comprising:
a perforated drainer;
a processing receptacle;
a byproduct receptacle;
a vacuum pump;
a structural base;
a motor;
a heater;
a controller;
at least one interchangeable food-interacting head;
a lid;
the processing receptacle being mounted onto the structural base;
the byproduct receptacle being mounted around the processing receptacle;
the vacuum pump being in fluid communication with the processing receptacle through the byproduct receptacle;
the perforated drainer being situated within the processing receptacle;
the heater being integrated into the structural base;
the heater being in thermal communication with the processing receptacle;
the lid being hermetically attached to the processing receptacle, opposite the structural base;
the vacuum pump and the motor being mounted into the lid;
the controller being mounted within the lid;
the at least one interchangeable food-interacting head being operatively coupled to the motor, wherein the motor is used to rotationally drive the at least one interchangeable food-interacting head within the perforated drainer; and
the controller being electronically connected to the heater, the vacuum pump, and the motor.

2. The food-making countertop appliance as claimed in claim 1 comprising:
a plurality of drainage tubes;
each of the plurality of drainage tubes traversing out of the processing receptacle and into the byproduct receptacle; and
the plurality of drainage tubes being positioned around the processing receptacle.

3. The food-making countertop appliance as claimed in claim 1, wherein the lid is magnetically attached to the byproduct receptacle.

4. The food-making countertop appliance as claimed in claim 1 comprising:
an ingredient inlet; and
the ingredient inlet traversing through the lid and into the processing receptacle.

5. The food-making countertop appliance as claimed in claim 4 comprising:
an inlet stopper; and
the inlet stopper being hermetically attached into the ingredient inlet.

6. The food-making countertop appliance as claimed in claim 1 comprising:
a pump exhaust;
the vacuum pump comprising a pump inlet and a pump outlet;
the pump exhaust being integrated into the lid, adjacent to the pump outlet; and
the pump inlet being positioned into the byproduct receptacle.

7. The food-making countertop appliance as claimed in claim 1 comprising:
a receptacle setting;
the receptacle setting being connected around the processing receptacle; and
the byproduct receptacle being mounted onto the receptacle setting.

8. The food-making countertop appliance as claimed in claim 1 comprising:
the motor comprising a stator and a rotor;
the stator being connected into the lid; and
the rotor traversing out of the lid and into the processing receptacle.

9. The food-making countertop appliance as claimed in claim 1 comprising:
the at least one interchangeable food-interacting head comprising a cutter and a shaft;
the cutter comprising a plurality of first blades and a plurality of second blades;
a rotor of the motor being torsionally connected to the shaft;
the cutter being laterally connected to the shaft;
the plurality of first blades being positioned perpendicular to the plurality of second blades; and
the plurality of first blades and the plurality of second blades being arranged in a grid configuration.

10. The food-making countertop appliance as claimed in claim 9 comprising:
each of the plurality of first blades being positioned at a first acute angle with a central axis of the perforated drainer; and
each of the plurality of second blades being positioned at a second acute angle with the central axis of the perforated drainer.

11. The food-making countertop appliance as claimed in claim 1 comprising:
the at least one interchangeable food-interacting head comprising a press, a track, and a shaft;
a rotor of the motor being torsionally connected to the shaft;
the shaft being threadably engaged into the press, offset from the rotor of the motor;
the press being positioned normal to a central axis of the perforated drainer;
the track being positioned within the processing receptacle;
the track being rotatably connected to the shaft; and
the press being slidably engaged along the track.

12. The food-making countertop appliance as claimed in claim 11 comprising:
the track comprising an L-shaped bracket and a guidance bridge;
the L-shaped bracket comprising a first bracket leg and a second bracket leg;
the guidance bridge comprising a proximal bridge end and a distal bridge end;
the first bracket leg being rotatably connected to the shaft;
the second bracket leg being connected perpendicular to the first bracket leg, offset from the shaft;
the distal bridge end being slidably connected along the second bracket leg; and
the proximal bridge end being laterally connected to the press.

13. The food-making countertop appliance as claimed in claim 1 comprising:
a cover; and
the structural base, the processing receptacle, the byproduct receptacle, and the at least one interchangeable food-interacting head being housed by the cover.

14. The food-making countertop appliance as claimed in claim 1 comprising:
a user-interfacing panel;
the user-interfacing panel being mounted into the lid, opposite the processing receptacle; and
the user-interfacing panel being electronically connected to the controller.

15. The food-making countertop appliance as claimed in claim 1 comprising:
a wireless communication module;
an external computing device;
the wireless communication module being mounted within the lid;
the wireless communication module being electronically connected to the controller; and
the wireless communication module being communicably coupled to the external computing device.

16. The food-making countertop appliance as claimed in claim 1 comprising:
a temperature sensor;
the temperature sensor being in thermal communication with the processing receptacle; and
the temperature sensor being electronically connected to the controller.

17. The food-making countertop appliance as claimed in claim 1 comprising:
a weight sensor;
the weight sensor being pressed in between the processing receptacle and the structural base; and
the weight sensor being electronically connected to the controller.

18. The food-making countertop appliance as claimed in claim 1 comprising:
a pressure sensor;
the pressure sensor being integrated into the byproduct receptacle; and
the pressure sensor being integrated into the byproduct receptacle.

* * * * *